United States Patent [19]
Di Biasi et al.

[11] Patent Number: 5,111,933
[45] Date of Patent: May 12, 1992

[54] KIT PROVIDING THERMALLY DEGRADABLE COMPOST BAG

[75] Inventors: Daniel J. Di Biasi, Pittsford, N.Y.; Frederick C. Schwab, Metuchen, N.J.

[73] Assignee: Mobil Oil Corporation, Fairfax, Va.

[21] Appl. No.: 690,178

[22] Filed: Apr. 16, 1991

[51] Int. Cl.$^5$ .................. B65D 69/00; B65D 30/02
[52] U.S. Cl. ........................ 206/223; 383/1; 220/DIG. 30
[58] Field of Search ............ 206/223; 383/1; 220/DIG. 30

[56] References Cited

U.S. PATENT DOCUMENTS

| | | |
|---|---|---|
| 3,454,510 | 7/1969 | Newland et al. ............ 220/DIG. 30 |
| 3,795,654 | 3/1974 | Kirkpatrick .............................. 383/1 |
| 3,856,747 | 12/1974 | DiBiasi et al. . |
| 3,935,141 | 1/1976 | Potts et al. . |
| 4,067,836 | 1/1978 | Potts et al. . |
| 4,797,690 | 3/1974 | Taylor et al. ............................ 383/1 |

FOREIGN PATENT DOCUMENTS

WO88/09354 12/1988 PCT Int'l Appl. .
1054808 1/1967 United Kingdom ....... 220/DIG. 30

*Primary Examiner*—William I. Price
*Attorney, Agent, or Firm*—Alexander J. McKillop; Charles J. Speciale

[57] ABSTRACT

The present invention comprises a method of providing a polymeric based compost bag formed with a relatively high percentage of thermal oxidative degradation catalyst, such as a transition metal salt, and, preferably, a process stabilizer. The stabilizer permits the use of high levels of the thermal oxidative degradation catalyst without the risk of premature accelerated degradation during manufacturing and storing. According to the present invention, the compost bags are packaged in containers which are impervious to gases and vapors thus depriving the pro-oxidant of the oxygen necessary to degrade the polymer. The package may also provide a barrier to the loss of stabilizer during storage. Also disclosed is a kit for the disposal of waste.

2 Claims, No Drawings

KIT PROVIDING THERMALLY DEGRADABLE COMPOST BAG

The present invention is directed to a method of providing a degradable compost bag and, more particularly, to a method of providing a compost bag whose degradation is thermo-oxidatively activated as well as a kit useful for the disposal of refuse.

BACKGROUND OF THE INVENTION

The use of composts has been known for years as a sensible, environmentally safe and efficient method for converting organic waste such as fallen leaves, grass clippings and wet garbage into useful fertilizer or a ground filler. Aerobic decomposition or composting is the controlled decomposition of organic matter in the presence of atmospheric oxygen through natural microbial activities. Since the decomposition of organic matter is dependent upon the microbial activity it is desirable to create an environment in which the microbes can thrive. For example, it is preferable to provide the proper oxygen, moisture, and temperature conditions that will promote the biological activities of microbes and, therefore, speed up the decomposition process of the organic matter.

In a typical compost, naturally occurring microorganisms digest the organic waste converting it into water, carbon dioxide, nitrogen, potassium ($K_2O$), phosphorus ($P_2O_5$) and lower molecular weight hydrocarbons. Optimum conditions for this degradation process typically comprise temperatures of about 40°-60° C. and moisture levels of about 40-60%. The heat necessary to maintain these optimum conditions is generated by the microorganisms as they digest the waste material.

Those skilled in the art will also appreciate that composting generally requires a minimal amount of maintenance. Such maintenance may include the "turning" of the compost to resupply oxygen to the internal portions of the compost thereby replenishing oxygen which is depleted by the microorganisms as they digest the waste material. Oxygen is essential to the respiration of bacteria and fungi that decompose the waste. The presence of adequate oxygen will promote the growth of these microbes and prevent the process from becoming anaerobic or oxygen deprived. The lack of atmospheric oxygen can decrease the rate of decomposition and promote the production of foul odors.

As one way of reducing solid wastes, it is not uncommon for government entities to establish large composts with the leaves and grass clippings generated by their populations. In order to effectively conduct large-scale compost programs, manageable containers, e.g. bags, should be supplied to community residents so that the leaves and grass clippings can be properly bagged for transportation to a compost site.

One type of compost bags which has gained some approval by municipalities are made of multi-wall craft paper. While these paper bags have a good rate of degradation, they are bulky, relatively expensive to manufacture, and tend to lose their strength when wet. While conventional polyethylene plastic bags do not have these disadvantages, steps must be taken to enhance this degradation of such bags. For example, one known method involves adding starch and a pro-oxidant such as a transition metal salt to polyethylene prior to extruding the resin into films. Adding starch to the polymer resin necessitates processing precautions, such as moderating the preparation and extrusion temperatures in order to avoid burning the starch and carbonizing the extrusion die.

Another limitation imposed on known polyethylene compost bags of this type is a limitation on the amount of transition metal salt which may be added. The transition metal salt is added in order to enhance the thermal oxidative degradation of the bag. By increasing the amount of transition metal salt in the polyethylene matrix, the temperature at which degradation occurs is lowered and thus, degradation may proceed more rapidly. In order to avoid premature degradation from the high temperatures incurred during shipping of the compost bags by trucks or when the bags are stored in a warehouse, the amount of prooxidant in conventional degradable thermoplastics is generally maintained at low levels.

Another method of avoiding premature degradation is through the use of stabilizers which inhibit the action of the prooxidant but, when consumed, will allow the degradation to proceed. Defining the precise amount of stabilizer needed to assure adequate storage stability is difficult. If too little is added, the material will degrade during storage and warehousing. If too much is added, the article will not degrade under composting conditions.

It would, therefore, be desirable to provide a compost bag in a manner which provides the strength, economy and low bulk of plastic bags while being easier to manufacture and having a more controlled rate of thermal oxidative degradation than compost bags known in the art.

SUMMARY OF THE INVENTION

The present invention overcomes disadvantages of previously known compost bags with a method of providing a polyethylene based compost bag formed with a relatively high percentage of thermal oxidative degradation catalyst, such as a transition metal salt, and, preferably, a process stabilizer. The stabilizer permits the use of high levels of the thermal oxidative degradation catalyst without the risk of premature accelerated degradation during manufacturing and storing. According to the present invention, the compost bags are packaged in containers which are impervious to gases and vapors thus depriving the pro-oxidant of the oxygen necessary to degrade the polymer. The package may also provide a barrier to the loss of stabilizer during storage. Once the compost bags of the present invention are removed from the barrier package, thermal oxidative degradation of the polymer will begin. By essentially eliminating degradation which might occur prior to use, the films of the present invention may be designed to undergo rapid thermal oxidative degradation once exposed to the atmosphere. In this manner, the compost bags of the present invention are thermally degradable at rates significantly faster than polyethylene based compost bags known in the art.

The present invention also comprises a kit useful for the disposal of waste.

DETAILED DESCRIPTION

The compost bags of one embodiment of the present invention comprise polyethylene, a thermal oxidative degradation catalyst and, a stabilizer which is initially present in an amount effective to impede the degradation catalyst. The stabilizer is advantageously selected such that it is highly volatile under the temperature conditions encountered in a compost environment. In this manner, when a compost bag of the present invention is placed in a compost environment, the antioxidant will vaporize leaving the thermal oxidative degradation catalyst free to begin the degradation process.

A lesser amount of stabilizer or a less volatile stabilizer may be used in quantities sufficient to permit successful manufacture but not enough to impede degradation thereafter. In this case, substantially all of the antioxidant will be rendered ineffective during the manufacturing of the film, leaving the prooxidant uninhibited to commence degradation when the bag is subsequently exposed to the atmosphere and placed in composting conditions.

As used herein, the term "rendered ineffective" when used in regard to the antioxidant is intended to mean that the antioxidant no longer substantially inhibits the thermal oxidative degradant. For example, the antioxidant may be rendered ineffective by vaporizing and leaving the film or by breaking down and losing effectiveness in the polymer matrix.

The compost bags of the present invention preferably comprise about 75–100% of polyethylene.

The thermal oxidative degradation catalyst of the present invention is preferably in the form of a metal salt such as a stearate of cobalt, manganese, iron, chromium, nickel, cadmium, silver, cerium, zinc, vanadium, copper, blends such as cobalt/manganese stearate and cobalt/iron stearate, and mixtures thereof. It is preferable to use a thermal oxidative degradation catalyst having a relatively high order of activity in order to facilitate a more rapid degradation process.

Based on the active metal content of these degradation catalysts, these catalysts are preferably present in an amount of about 20–2000 ppm based on metal, more preferably about 20–500 ppm, and most preferably about 50–150 ppm.

The most preferred thermal oxidative degradation catalyst of the present invention is cobalt stearate which has been found to provide degradation activity over a broader range of temperatures than other transition metal salts.

While the use of a thermal oxidative degradation catalyst in the amounts set forth above would normally be undesirable since the sheet would start degrading during extrusion, shipping or storage, these adverse effects may advantageously be overcome by providing a labile stabilizer in the film which will impede the degradative process of the catalyst. The stabilizer selected should offer protection during manufacture, and possibly during storage conditions, but in turn should not interfere with the degradation process under composting conditions.

The stabilizers of the present invention may comprise butylated hydroxytoluene (BHT), 2,6 dimethylphenol butylated hydroxy ethyl benzene, Irganox 1076, Inganox 1010, phosphites such as trisnonylphenylphosphite (TNPP), P-EPQ and Irgafos 168. Also included may be thioesters such as dilauryl thiodipropionate (DLTDP) and distearyl thiopropionate (DSTDP), and thioureas. BHT is the preferred stabilizer of the present invention because of its relatively high volatility.

The amount of stabilizer utilized in the compost bags of the present invention should be carefully selected such that the stabilizer is present in an amount sufficient to impede the catalytic activity of the thermal oxidative degradation catalyst until the compost bag has been removed from the protective package for placement in a compost environment. When BHT is utilized, the BHT is preferably present in an amount of about 5–5000 ppm, more preferably no greater than about 50–500 ppm, and most preferably no greater than about 75–125 ppm in the film after the film has been thermoformed and cooled.

Some antioxidants may be rendered ineffective by carefully controlling conditions, such as temperature, time, and pressure, during the thermoforming step. Butylated hydroxytoluene (BHT) is a highly volatile antioxidant which is lost during the thermoforming step, e.g. 250 ppm BHT in a polyethylene resin has been found to yield about 75 ppm BHT in the final film. Another example are phosphite stabilizers which decompose during thermoforming. For example, a mixture containing 700 ppm of a phosphite stabilizer (Irgafos 168) showed no evidence of phosphite presence after thermoforming. According to one embodiment of the present invention, at least 50% and, more preferably, at least 95% of the stabilizer initially present in the resin is rendered ineffective during the thermoforming step.

In order to avoid premature degradation of the compost bags of the present invention, which may be subjected to elevated temperatures at times after manufacture but before being placed in a compost environment, the bags of the present invention are advantageously stored in a container which is impermeable to gases and vapors such as oxygen and volatile stabilizers. For example, one or more of the compost bags of the present invention may be packaged in a pouch or a box which is lined or overwrapped with a barrier film such as aluminum foil, or other barrier films containing poly(vinylidene chloride) or vinyl alcohol polymers or copolymers. In this manner, even if the compost bags are subjected to elevated temperatures during shipping or storing, the function of the thermo-oxidative catalyst will be thwarted by the denial of sufficient oxygen or the presence of the captive stabilizer. If the antioxidant is rendered ineffective during manufacturing, the degradable film may be sealed in an oxygen free pouch containing an inert gas which will not induce degradation. The package utilized to provide vapor barrier protection is preferably compostable when exposed to a composting environment. For example, a polymer film such as poly(vinyl alcohol) has excellent oxygen barrier properties but is readily biodegraded.

While the present invention has been described herein as comprising a compost bag, the term "compost bag" is intended to include any form of disposable receptacle formed as described herein.

In order to illustrate the improved degradation of the degradable films of the present invention, three embodiments of the present invention were compared with two commercially available plastic films promoted for their degradability.

EXAMPLES

Naturegrade-plus (Manufactured by Petosky Plastics, Inc.) and Ruffies (Manufactured by Poly-Tech Inc.) are commercially available compost bags containing corn starch, e.g. about 6%, vegetable oil as an oxidation promoter, and a small amount of iron as a degradant. Examples 1, 2 and 3 are test films produced by standard polyethylene blown film techniques containing the additives cobalt stearate and BHT in the following amounts:

|              | Example 1 | Example 2 | Example 3 |
|--------------|-----------|-----------|-----------|
| Cobalt metal, ppm | 85   | 90        | 90        |
| BHT, ppm     | 0         | 75        | 83        |

Table 1 is a tabulation of the data obtained from a fluorescent UV and condensation apparatus test. Degradation was based on tensile elongation (maximum percent strain) in percent and was tested according to the procedure of ASTM D-638.

Test Conditions:
  55° Centigrade
  No Light, 100% humidity.

TABLE 1

| TIME (WEEKS) | PERCENT ELONGATION (%) ||||| 
|---|---|---|---|---|---|
|   | NATURE-GRADE | RUFFIES | Example 1 | Example 2 | Example 3 |
| 0    | 663.9 | 636.0 | 737.8 | 796.4 | 788.0 |
| 0.5  | 690.7 | 640.8 | 42.57 | 770.6 | 825.0 |
| 1.0  |       |       | 23.11 | 97.49 | 742.9 |
| 1.5  | 690.0 | 651.6 | 20.14 | 29.98 | 303.0 |
| 2.0  |       |       | 14.65 | 13.04 | 154.0 |
| 2.5  | 669.2 | 647.3 | 8.24  | 11.21 | 25.17 |
| 3.0  |       |       | 10.37 | 9.61  | 9.15  |
| 3.5  |       |       | 6.41  | 7.63  | 7.32  |
| 4.0  | 674.9 | 673.1 | 5.49  | 5.49  | 5.49  |
| 4.5  | 661.6 | 658.0 |       |       |       |
| 5.0  |       |       |       |       |       |
| 5.5  | 621.3 | 656.8 |       |       |       |
| 6.0  |       |       |       |       |       |
| 6.5  | 634.2 | 654.1 |       |       |       |
| ⋮    |       |       |       |       |       |
| 10.0 | 663.2 | 601.0 |       |       |       |
| ⋮    |       |       |       |       |       |
| 13.5 | 539.6 | 658.7 |       |       |       |
| ⋮    |       |       |       |       |       |
| 17.0 | 668.3 | 692.1 |       |       |       |

The significantly reduced elongation of the film of the present invention clearly indicates the accelerated degradability obtained with the present invention. The following is an illustration of the effect of a barrier package on thermal-oxidative degradation.

Table 2 is a tabulation of the change in the molecular weight of the compost bags of Example 3 stored at 60° C. (140° F.) for a period of four months in a vapor proof aluminum foil pouch vs. without a barrier package.

TABLE 2

| Pouch | MONTHS AT 60° C. |||||
|---|---|---|---|---|---|
|    | 0 | 1 | 2 | 3 | 4 |
| Mn | 25,400 | 26,700 | 24,800 | 19,780 | 18,120 |
| Mw | 101,900 | 104,400 | 96,600 | 100,973 | 98,000 |

| Without Pouch | MONTHS AT 60° C. ||
|---|---|---|
|    | 0 | 1 |
| Mn | 31,960 | 1,790 |
| Mw | 129,800 | 5,300 |

The sharp decrease in molecular weight of the bags which were not stored in vapor proof pouches indicates that the long polymer chains of the polyethylene were being broken by the thermal oxidative degradation catalyst.

According to another embodiment of the present invention, a method is provided wherein the above-described compost bag is placed into a sealed package which is filled with an inert gas such as $N_2$, He, or Ar.

The present invention may also comprise minor amounts of other additives to facilitate manufacturing or to increase consumer appeal. For example, thermoplastic film is often formed with slip agents, antiblocks, fluorocarbon processing aids, fillers, dyes, pigments, biocides and perfumes. These additives are referred to herein as "consumer/manufacturing" additives.

The compost bags of the present invention may be formed using conventional film-forming techniques. For example, polyethylene pellets may be extrusion melted and formed into film by conventional blown-tube methods or by cast extrusion As used herein, the term "thermoforming" is meant to include all methods of polymer fabrication which utilize heat.

We claim:

1. A kit useful for the disposal of refuse comprising:
   a) at least one degradable container comprising a major portion of a polyethylene, a thermal oxidative degradation catalyst and an antioxidant; and
   b) a vapor-proof package enveloping said container thereby preventing ambient oxygen from contacting said container, wherein said package comprises a compostable polymer.

2. A kit according to claim 1 wherein said vapor-proof package contains only one sack.

* * * * *